United States Patent [19]

Theodolin

[11] Patent Number: 4,969,654
[45] Date of Patent: Nov. 13, 1990

[54] CLAMPING CHUCK FOR A MACHINE TOOL

[75] Inventor: Georges Theodolin, Rueil Malmaison, France

[73] Assignee: Gamet Precision, Neubourg, France

[21] Appl. No.: 268,977

[22] Filed: Nov. 9, 1988

[30] Foreign Application Priority Data

Nov. 24, 1987 [FR] France ................. 87 16243

[51] Int. Cl.⁵ .......................................... B23B 31/175
[52] U.S. Cl. .................................. 279/119; 279/123; 279/110
[58] Field of Search ............... 279/119, 123, 118, 120, 279/121, 122, 110, 1 C, 117

[56] References Cited

U.S. PATENT DOCUMENTS

| | | | |
|---|---|---|---|
| 3,682,491 | 8/1972 | Sakazaki et al. | 279/1 |
| 3,744,808 | 7/1973 | Hughes | 279/1 SJ |
| 4,270,763 | 6/1981 | Röhm | 279/123 |
| 4,352,500 | 10/1982 | Blättry et al. | 279/123 X |
| 4,362,306 | 12/1982 | Röhm | 279/123 X |
| 4,506,896 | 3/1985 | Jackson et al. | 279/119 X |
| 4,725,065 | 2/1958 | Hiestand | 279/123 |

FOREIGN PATENT DOCUMENTS

| | | | |
|---|---|---|---|
| 0070985 | 2/1983 | European Pat. Off. | |
| 0070987 | 2/1983 | European Pat. Off. | |
| 2240871 | 3/1974 | Fed. Rep. of Germany | |
| 2937194 | 3/1981 | Fed. Rep. of Germany | 279/123 |
| 2949566 | 6/1981 | Fed. Rep. of Germany | 279/123 |
| 3434308 | 3/1986 | Fed. Rep. of Germany | |
| 2306038 | 10/1976 | France | |
| 2025808 | 1/1980 | United Kingdom | 279/123 |

Primary Examiner—Z. R. Bilinsky
Assistant Examiner—Robert Schultz
Attorney, Agent, or Firm—A. W. Breiner

[57] ABSTRACT

The invention relates to a clamping chuck. The clamping parts of the jaws are connected to support pieces sliding radially inside the body by means of bolts sliding axially inside these support pieces and provided with teeth.

An axially sliding operating ring causes the jaws to clamp by acting on the support pieces by means of levers for example. The bolts are operated by actuating members.

To avoid undesired clamping when the clamping parts are disassembled or adjusted, means lock the operating ring when an actuating member is in the position corresponding to retraction of the bolt, preferably before this retraction can be performed.

6 Claims, 3 Drawing Sheets

FIG.:1
FIG.:2
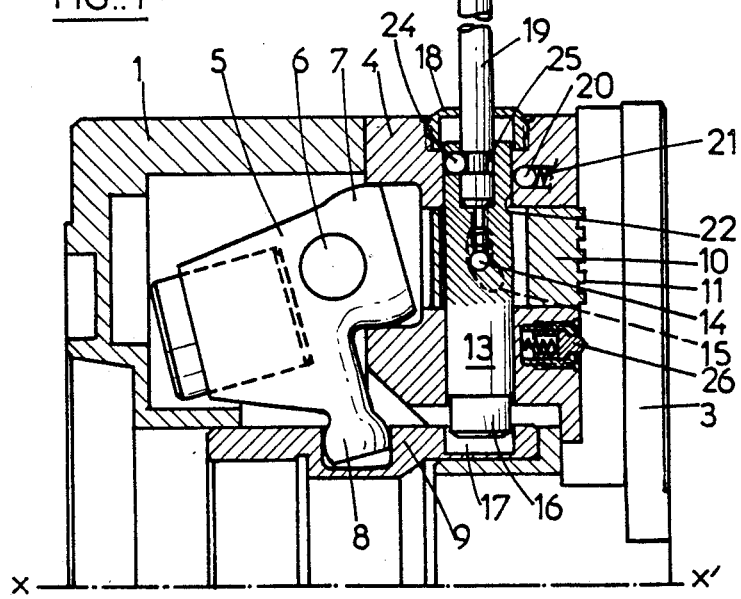
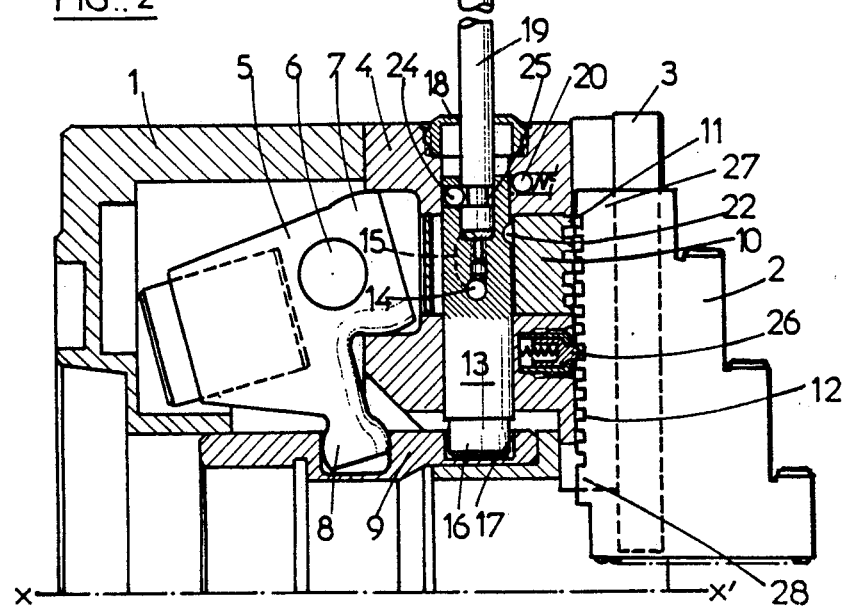

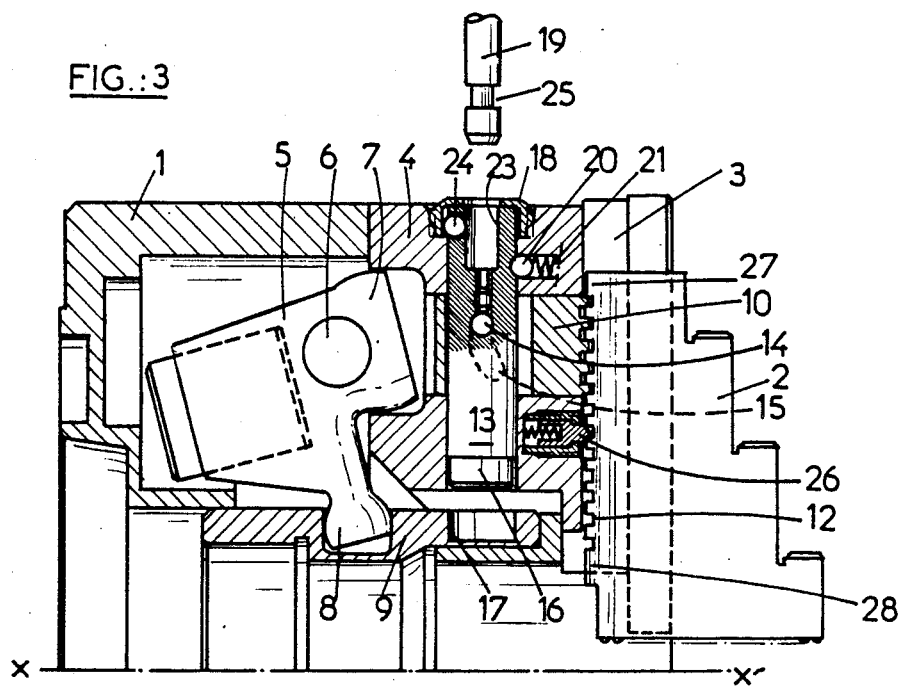
FIG.: 3
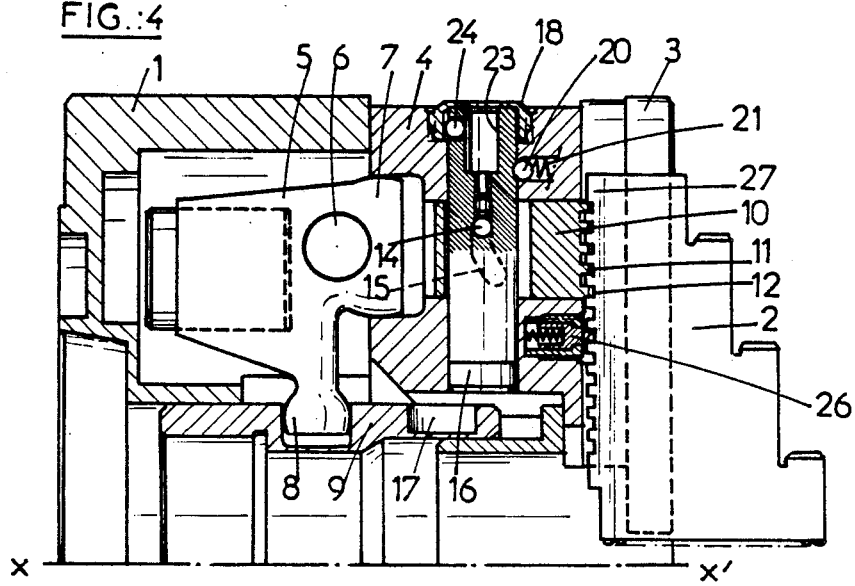
FIG.: 4

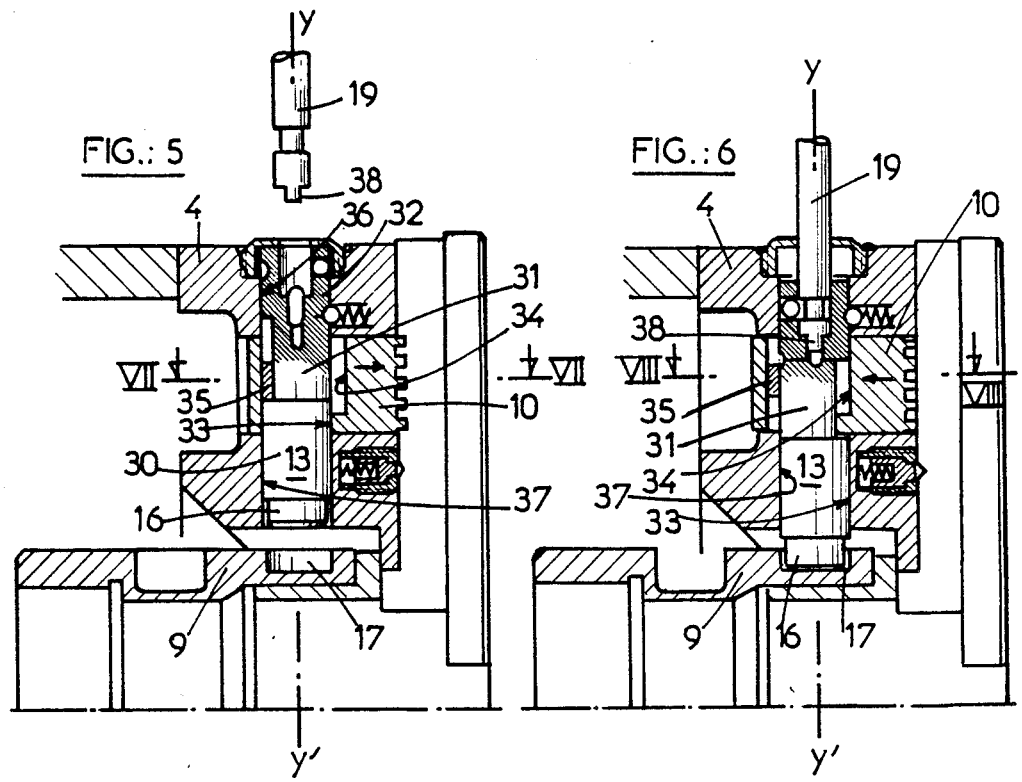
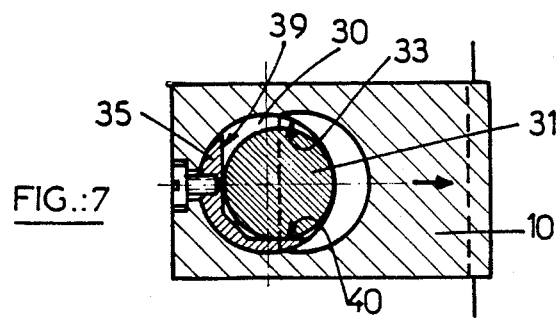
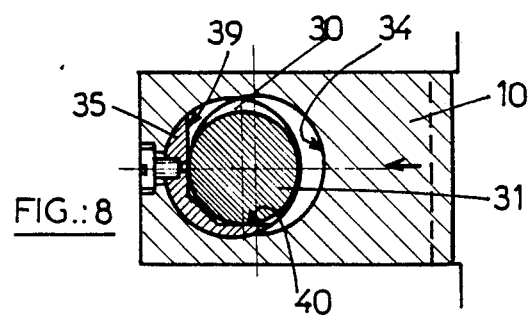

CLAMPING CHUCK FOR A MACHINE TOOL

BACKGROUND OF THE INVENTION

The present invention relates to a clamping chuck for a machine tool.

For a long time such chucks have been known, in which each jaw comprises a support piece slidably mounted in a radial groove in the chuck body, a clamping part slidably mounted in a radial groove in the body or the support piece, a bolt movable axially inside the support piece and provided with teeth capable of cooperating with a toothing of the clamping part so as to fix the latter relative to the support piece, an actuating member movable relative to the support piece and capable of passing from a first position, where it keeps the bolt engaged with the toothing of the clamping part, to a second position, where it keeps the bolt disengaged relative to the clamping part, the chuck comprising moreover an operating ring, which is able to perform an axial sliding action, and means for transforming this axial sliding action into radial displacement of the support pieces of the jaws relative to the chuck body. Such chucks are described, for example, in US-A-3,682,491. They enable the clamping parts to be rapidly changed or rapidly adapted to different sized workpieces.

Such chucks pose a danger because of their structure: when a clamping part is changed or removed, an incorrect maneuver may actuate the operating ring, thereby possibly damaging the tool or even injuring the operator. Electrical safety devices or the like are of course provided, but it is still possible that an accident may occur as a result of carelessness or incorrect operation of the safety devices.

DE-A-3,434,308 proposed an actuating member comprising a locking part which cooperates with a part of the operating ring having a matching shape, the actuating member being provided with a projection which penetrates into a cavity in the operating ring, these two parts cooperating when the drive member is in the second position, i.e. during disengagement of the clamping part, and the operating ring is in the corresponding position, such that displacement of the actuating member is possible only in a defined position of the operating ring.

According to this document, the bolt is operated by means of a rectilinear cam surface which is oblique relative to the radial direction and mounted on the operating member. Consequently, there is imprecision with regard to the relative position when the bolt is disengaged and the operating ring is locked, which may result in an accident.

The object of the present invention is to overcome this drawback.

SUMMARY OF THE INVENTION

Consequently, according to the invention, the movement of the actuating member, in order to pass from the first position to the second position, comprises a first phase during which the locking part comes into engagement with the matching part of the operating ring, so as to prevent sliding of said ring, while the bolt is still held in position, then a second phase during which said actuating member brings the bolt into the disengaged position, the movement for passing from the second position to the first position comprising, correspondingly, a phase during which the bolt is disengaged followed by a phase during which the operating ring is released.

Therefore, the operating ring is not released so long as the bolt is not engaged with the clamping part.

Preferably:

if the movement of the actuating member during said first phase is a radial movement, provision is made for said locking part of the actuating member to be an axially oriented projection, and for the matching part of the operating ring to be a radial cavity into which said projection penetrates, or vice versa, if the movement of the actuating member is a radial movement during the two phases, and . . . the bolt is displaced by means of a cam surface oblique relative to the radial direction, provision is made for a cam surface comprising a radial part active during the first phase of the movement, and an oblique part, active during the second phase, if the movement of the actuating member, during the first phase, is a radial movement, provision is made, according to a still further preferred method, for the actuating member to perform, during the second phase, a rotation about the radial axis (y—y') of said actuating member, this rotation causing displacement of the bolt owing to the action of an eccentric part mounted on said operating member.

According to the aforementioned DE-A-3,434,308, a spring acts permanently on the actuating member so as to push it towards the first position, and a positive external action is required in order to keep the actuating member in the second position.

In order to overcome this drawback, again according to the invention, the actuating member may be fixed in each of the two positions without the intervention of an external force, and may be moved from one position to another, and vice versa, only by means of a key with a suitable shape.

Advantageously, the chuck comprises automatically means for automatically holding the key inside the chuck when the actuating member is in the second position.

As can be seen, these two embodiments ensure an excellent degree of safety obtained by purely mechanical means, unlike the electrical safety devices or other devices currently used.

According to the prior art, the teeth on the bolt and the clamping part have a trapezoidal shape. This shape has the drawback of reducing the precision with which the clamping part is radially located. For greater reliability, it is advantageous if the teeth of the bolt, as well as those of the clamping part, have a square cross-section and if the support piece accommodates a spring-loaded push-piece arranged so as to penetrate into a tooth space in the toothing of the clamping part, so as to cause this toothing to engage with the teeth of the bolt.

Advantageously, the side of the clamping part facing the support piece has, beyond the end of the toothing, a raised part which is the same height as the teeth, but without tooth spaces. Thus, the risk of having only a small number of teeth on the bolt engaged with the toothing of the clamping part is avoided.

The invention will now be described in more detail with the aid of practical examples shown in the drawings, in which:

BRIEF DESCRIPTION OF THE DRAWINGS

FIGS. 1 to 4 are axial sections through a first embodiment, at different stages during adjustment of the position of the clamping parts;

FIGS. 5 and 6 are similar views of a second embodiment, and

FIGS. 7 and 8 are partial sections along the line VII—VII of FIG. 5 and the line VIII—VIII of FIG. 6, respectively.

DETAILED DESCRIPTION OF PREFERRED EMBODIMENTS OF THE INVENTION

The device shown in FIGS. 1 to 4 comprises a chuck body 1, which has the shape of a cylindrical part, with an axis of symmetry x—x' at the bottom of the figures. This body is intended to carry, in the example chosen, three jaws, but it is obvious that the number of jaws may be different, for example two or four. The jaws are arranged symmetrically relative to the axis x—x', and the figures show only a half-section through the plane of symmetry of a jaw.

A clamping part 2, which constitutes the actual jaw, is able to slide in a radial slide consisting of a groove 3 with a T-shaped cross-section. The opposite side of the body 1, on the left in the figures, is provided with means, not shown, enabling fixing to a machine tool. This side will subsequently be called the rear side of the support, the side carrying the clamping parts therefore being called the front side.

Behind the slides 3, a radially oriented seating contains a support piece 4 which is thus able to slide radially inside this seating relative to the body 1. Even further behind, a cavity in the body 1 contains an angle lever 5 pivotably mounted on a pin 6, perpendicular to the plane of symmetry of the jaw. A first arm 7 of the lever 5 penetrates into a cavity in the support piece 4, while the end 8 of the other arm of the lever 5 penetrates into a cavity in an operating ring 9 coaxial with the body 1 and axially movable inside the latter owing to the action of drive means, not shown. The shape of the lever 5 is designed so that displacement of the operating ring 9 in the axial direction causes displacement of the support piece 4 in the radial direction.

The support piece 4 has an axial cavity inside which a connecting piece, or bolt 10, is able to move, sliding axially. The bolt 10 has, on its front side, a series of teeth 11 with a rectangular cross-section, designed to cooperate with a toothing 12 provided on the rear side of the clamping part 2. It is obvious that, when the teeth 11 are engaged with the toothing 12, a radial movement of the support piece 4, corresponding to an axial displacement of the operating ring 9, results in radial displacement of the clamping part 2 and thus ensures clamping of a workpiece, not shown. On the other hand, if the bolt 10 is retracted, so as to separate the teeth 11 from the toothing 12, the clamping part 2 may be displaced axially relative to the support piece 4, either to modify the relative position of these two parts by an amount equal to a step of the toothing, or to remove completely the clamping part 2, for example so as to replace it with another.

In order to displace the bolt 10, an actuating member is provided, consisting essentially of a radial rod, or plunger 13, which is able to slide radially inside a seating in the support piece 4. The plunger 13 has, running through it, a pin 14 which is oriented perpendicularly to the plane of symmetry of the jaw and which penetrates, with its two ends, into grooves 15 of the bolt. The parts of these grooves furthest from the axis x—x' are oriented radially and the parts closest to this axis are oriented obliquely. This inclined part of the grooves 15 constitutes a cam surface by means of which the pin 14 pushes the bolt 10 towards the rear when the plunger is inserted. Moreover, the plunger 13 has, on its part closest to the axis, a radially oriented extension 16 which is positioned opposite a cavity 17 in the operating ring 9 when the latter is in the position corresponding to unclamping of the clamping parts 2.

If, starting from a situation where the plunger is radially furthest from the axis x—x' (FIG. 3), it is gradually pushed towards the axis, while the pin 14 travels through the radial part of the groove 15, the plunger will advance until it penetrates into the cavity 17 of the operating ring, as shown in FIG. 1. Then, continuation of the movement causes the projecting part 16 to enter a little further into the cavity 17 and at the same time causes the pin 14 to advance further inside the oblique part of the groove 15, thereby causing the bolt 10 to retract into the position shown in FIG. 2.

In its position furthest from the axis x—x', shown in FIGS. 3 and 4, the plunger 13 bears against a stopper 18 which seals off its seating radially with respect to the exterior. The stopper 18 has, in its center, a hole which accommodates a key 19. The plunger 13 is kept in this same end position by a ball 20 acted on by a spring 21 located inside a seating oriented axially inside the support piece 4. The ball 20 enters into a recess 22 (visible in FIG. 2) in the plunger 13 and thus prevents it from moving in the direction of the axis x—x'.

On its radially external part, the plunger 13 has a radial cavity 23 which is able to receive the front end of the key 19. A ball 24 is able to move in a seating oriented axially inside the wall of the plunger, between a position where it projects on the external side of the plunger and a position where it projects inside the cavity 23. The seating for the plunger, in the support piece 4, has moreover a widened portion underneath the stopper 18. When the key 19 is introduced into the cavity 23, it starts by pushing back the ball 24 towards the outside, inside the widened portion of the plunger seating. Continuing its movement, the key reaches a position where a neck 25 in this key is located opposite the ball 24. The latter thus enters into this neck, and further insertion of the key and the plunger 13 thus locks the latter and the key together, the ball 24 being pushed into the neck by the wall of the plunger seating. When the assembly consisting of the plunger and the key is in its end position closest to the axis x—x', this assembly is kept in this position by the friction in the region of the oblique part of the groove 15 and therefore does not tend to move away radially outwards. Moreover, such an outwards movement would be immediately detected by movement of the key.

The support piece 4 has, on its front side, a spring-loaded push-piece 26 provided with a ball designed to enter into the space between two teeth of the toothing 12. The use of this spring-loaded push-piece is to enable precise location of the toothing 12 relative to the teeth 11 of the bolt. It will be noted that the fact that this spring-loaded push-piece is mounted on the support piece, together with the rectangular shape of the teeth, does not give rise to any force on the bolt itself and therefore does not tend to push the teeth out of engagement, as would be the case in the current state of the art where the teeth have a trapezoidal shape.

Moreover, on either side of the toothing 12, two zones 27, 28 extend the tips of the teeth in this toothing, but do not possess any spaces into which the teeth 11 of the bolt could penetrate. As a result of this arrangement, it is not possible for only part of the teeth of the bolt to be engaged with the toothing 12: either all the teeth of the bolt penetrate into the gaps in the toothing 12, or the bolt cannot be moved, thereby making it impossible to move the plunger 13 and, consequently, actuate the operating ring 9, such that the risk of an accident is thus eliminated.

The device shown in FIGS. 5 to 8 differs essentially from that shown in FIGS. 1 to 4 owing to the shape of the plunger 13 and its seating inside the bolt 10. The plunger 13 has a cylindrical front part 30 oriented towards the axis x—x' and ending in the projecting part 16 which, as in the previous embodiment, penetrates into a cavity 17 in the operating ring. The front part 30 is connected to a middle part 31, which is also cylindrical, but has a smaller diameter and is eccentric. The plunger continues with a tail part 32 which forms an extension of the front part.

The bolt has passing through it a radial seating, the first part 33 of which, closest to the axis, is circular and has a diameter slightly greater than that of the front part 30. The remainder 34 of the seating has a much larger diameter, but it is partially obstructed by a wedge 35, the shape and function of which will be explained below and which is integral with the bolt.

The parts 30 and 32 of the plunger are guided in radial cylindrical recesses 36, 37 in the support piece 4.

In the position shown in FIGS. 5 and 7, the front part 30 of the plunger is engaged in the first part 34 of the seating. The wedge 35, resting against the eccentric 31, prevents rotation of the plunger about the axis y—y' which is common to the front part 31 of the plunger and the first part 33 of the seating inside the bolt.

If the plunger is inserted further so as to pass to the arrangement shown in FIGS. 6 and 8, the front part 31 of the plunger emerges from the bolt 10. Rotation of the plunger about its axis y—y' thus becomes possible. The eccentric 31 thus causes the bolt to move backwards by means of the wedge 35.

As can be seen in FIG. 6, this rotation only becomes possible after the projection 16 has penetrated into the cavity 17 so as to immobilise the operating ring. Rotation of the front part 30 causes the edge of this part to bear against the bolt and prevents movement of the plunger outwards so long as the eccentric has not returned to the position where the teeth 11 are engaged with the toothing 12.

The movements of the plunger are controlled by means of a key 19 which differs from that of the previous embodiment only in that it has a screwdriver-shaped end 38 for rotating the plunger.

The wedge 35 comprises a body with an abutment surface 39 perpendicular to the plane of symmetry of the jaw, and a flange with an abutment surface 40 perpendicular to the preceding one. These two abutment surfaces cooperate with the eccentric 31. The function of the abutment surface 40 is essentially to prevent rotation of the eccentric 31 through more than 180° and provide the operator with a more precise locating position for the position of the jaw.

The abutment surface 39 is used for axial displacement of the bolt backwards. During the reverse movement, it is the opposite surface of the part 33 of the seating which serves to move the bolt forward.

Other methods are, of course, possible. For example, transmission of the movement from the operating ring 9 to the support piece 4 may be achieved by means of cam surfaces instead of the angle-lever transmission described.

It is also possible to replace the bolt movement control system consisting of a translational or translational and rotational plunger by other systems, for example those described in EP-A-0 038 749.

It is also possible to have simultaneous control of the bolts consisting in several jaws with a known rotating-ring device. In this case, it is also this ring which will support the means for locking the operating ring.

I claim:

1. A clamping chuck for a machine tool, said chuck comprising:
   (a) a body, a plurality of jaw each having a support piece and a clamping part containing toothing, said body having a plurality of radial grooves, said jaws being slidably received within said radial grooves, said jaws and radial grooves being arranged and oriented to achieve clamping by radial movement of said jaws within said radial grooves, and a bolt mounted for axial movement within said support piece and said bolt having teeth engageable and disengageable with said toothing of said clamping part by axial movement of said bolt to selectively fix said clamping part to said support piece,
   (b) an axially slidable operating ring and a means for radially displacing said support piece of each of said jaws relative said chuck body by axial movement of said axially slidable ring, said axial slidable ring having a matching part means, and
   (c) an actuating member having a locking part means constructed and arranged to cooperate with said matching part mean s to axially lock said operating ring with respect to said actuating member, said actuating member being mounted in said support piece for radial and rotating movement along a radial axis, said matching part means of said operating ring being alignable with said locking part means of said actuating member in an aligned position by axial movement of said operating ring, said radial movement of said actuating member being between a first position in which said locking part means and said operating ring are spaced apart rendering said operating ring freely axially moveable relative said support piece and a second position in which said matching part means and locking part means cooperate when said operating ring is in said aligned position to axially lock said operating ring, said actuating member having an eccentric part means formed thereon which is engageable with said bolt for engaging and displacing said bolt by rotational movement of said actuating member to selectively engage and disengage said teeth of said bolt with said toothing of said clamping part.

2. Chuck as claimed in claim 1, wherein actuating member is an axially oriented projection, and the matching part of the operating ring is a radial cavity into which said projection penetrates, or vice versa.

3. Chuck as claimed in claim 1, including a means wherein the actuating member may be fixed in each of the two positions without the intervention of an external force and may be moved from one position to another and vice versa only by means of a key with a suitable shape.

4. Chuck as claimed in claim 3, including a means for automatically holding the key inside the chuck when the actuating member is in the second position.

5. Chuck as claimed in claim 4, wherein the actuating member comprises a tubular part inside which the key is able to engage and a ball movable inside a transverse passage of this tubular part, this ball entering into a neck in the key, being pushed by the wall of the seating of the actuating member when the latter is not in the first position, so as to lock the key together with said actuating member, and releasing the key by penetrating into a widened portion of said seating only when the actuating member is in the first position.

6. Chuck as claimed as in claim 1, wherein the teeth of the bolt, as well as those of the clamping part, have a square cross-section, and the support piece accommodates a spring-loaded push-piece arranged so as to penetrate into a tooth space in the toothing of the clamping part, so as to cause this toothing to engage with the teeth of the bolt.

* * * * *